United States Patent
Berrebi et al.

(12)

(10) Patent No.: US 6,472,009 B1
(45) Date of Patent: *Oct. 29, 2002

(54) PROCESS FOR REDUCING ALCOHOL LEVELS IN ALCOHOLIC BEVERAGES

(75) Inventors: Georges Berrebi, Demeurant le Village (FR); Yvan Gaillard, rue de Pologne (FR); Jean-Louis Guth, rue Bellevue (FR)

(73) Assignee: Societe Cool S.A.R.L. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 165 days.

(21) Appl. No.: 09/016,442

(22) Filed: Jan. 30, 1998

(30) Foreign Application Priority Data

Jan. 30, 1997 (FR) .............................. 97 01139

(51) Int. Cl.⁷ ................................. C12H 3/00
(52) U.S. Cl. ..................... 426/424; 426/330.4; 426/592
(58) Field of Search ................. 426/424, 592, 426/112, 115, 330.4

(56) References Cited

U.S. PATENT DOCUMENTS

| | | | | |
|---|---|---|---|---|
| 4,442,210 A | * | 4/1984 | Dessau et al. ............... | 435/161 |
| 4,814,188 A | | 3/1989 | Dziondziak | |
| 4,867,997 A | | 9/1989 | Wiesenberger et al. | |
| 4,882,177 A | | 11/1989 | Dziondziak | |
| 5,013,447 A | | 5/1991 | Lee et al. | |
| 5,308,631 A | * | 5/1994 | Anglerot ..................... | 426/422 |
| 5,310,568 A | * | 5/1994 | Lini ........................... | 426/422 |
| 5,385,647 A | * | 1/1995 | Brueschke et al. ............ | 203/39 |

FOREIGN PATENT DOCUMENTS

| | | |
|---|---|---|
| EP | 101254 | 8/1983 |
| EP | 228572 | 11/1986 |
| EP | 231072 | 1/1987 |
| EP | 332738 | 2/1988 |
| JP | 40612881 | * 5/1994 |

OTHER PUBLICATIONS

Lewis, R.J., Hawley's Condensed Chemical Dictionary, 12th Ed,., VNR Co., New York, 1993, pp. 1240–1241.*
English Abstract of DE 3,804,236.
Patent Abstracts of Japan, Abstract of JP 62–166990.
Phillip Crandall et al., Ullmann's Encyclopedia of Industrial Chemistry, vol. A4, "Benzyl Alcohol to Calcium Sulfate", pp. 35–36 and 421 and 453.
F.A. Farhadpour et al., "Separation of Alcohol–Water Mixtures by Liquid Phase Adsorption", pp. 203–217.
Encyclopedia of Chemical Technology, vol. 3, Antibiotics (Phenazines) to Bleaching Agents, pp. 693–735.
Gerald R. Cysewski et al., "Process Design and Econimic Studies of Alternative Fermentation Methods for the Production of Ethanol", Biotech. and Bioengin, vol. XX pp. 1421–144 (1978).
Neil B. Milestone et al., concentration of Alcohols by Adsorption on Silicalite, J. Chem. Tech., Biotechnol., vol. 31, pp. 732–736 (1981).
Separation, "A tailor–made technique for biotech separations".

* cited by examiner

*Primary Examiner*—Curtis E. Sherrer
(74) *Attorney, Agent, or Firm*—Millen, White, Zelano & Branigan, P.C.

(57) ABSTRACT

Passing an alcoholic beverage through a solid substance that has pores whose diameter allows only ethyl alcohol to pass through and fixes said alcohol by adsorption, said solid substance being either a Y-type zeolite or a monolithic-type microporous substance. In the beverage from which alcohol is partially or totally removed, the process makes it possible to retain in their entirety the molecules that are responsible in particular for the color, the aroma, and the taste of wine, and in particular cliousclatine and/or trypotophan.

8 Claims, No Drawings

PROCESS FOR REDUCING ALCOHOL LEVELS IN ALCOHOLIC BEVERAGES

SUMMARY OF THE INVENTION

This invention relates to a process and technology that make it possible to remove from wine (or any equivalent alcoholic beverage) part or even all of the ethyl alcohol that it contains.

This technology uses microporous solids, in particular of the hydrophobic zeolite type or any substance whose porous structure promotes adsorption, in whose structure the ethyl alcohol molecules and also, for example, any molecules whose molecular weight is equal to or less than that of ethyl alcohol are selectively adsorbed.

This patent application will define in detail the nature of microporous solids for a process that makes it possible to reduce, for example, the alcohol content of an alcoholic beverage by at least 20%, whereby said process involves running the alcoholic beverage over at least one bed of at least one solid substance or in bringing said alcoholic beverage into contact with a layer of at least one solid substance, whereby said solid substances are ones whose pore diameter and hydrophobicity characteristics make possible the specific adsorption of ethanol and other alcohols with a low molecular weight. In process, the solid substances are zeolites, solids with a monolith-type microporous structure, foams, or cloths made of these substances whose basic porous structure is favorable to adsorption.

A zeolite or solid with a microporous structure generally has openings that are equal to or greater than about 5 angstroms (1 angstrom=$10^{-10}$ m) and at least 90% of the pores are between 5 and 10 angstroms in diameter.

In the process, said solid substance is selected from the ZSM-5 and ZSM-5 from which aluminum is removed such as silicalite, Y zeolites with a faujasite structure, in particular, polysilsesquioxanes, arylsilsesquioxane gels, amorphous microporous silicas in the form of monoliths, molecular sieves with a carbon chain, quartzes, and activated carbon fibers.

The purpose of the processes described above is to remove at least part of the alcohol from the alcoholic beverages while at the same time retaining in the beverage the molecules that are responsible for the color, aroma, taste, and flavor of the beverage and in particular the tryptophan molecules and/or also the molecule that is called "cliousclatine" whose molecular weight is approximately 233 g, whereby said molecules act as a psychotropic and give individuals the pleasures of drinking wine.

We have discovered, during our investigations, that wine contains a molecule that has a psychotropic nature. Apparently, the presence of this molecule, which we have dubbed "cliousclatine," has never been identified in the literature as being present in wine and brings to this beverage the pleasure of drinking; the process according to the invention consists in selectively removing part or all of the alcohol contained in the wine so as to avoid the impairing effects of alcohol absorption at the digestive or mental level, while retaining cliousclatine and optionally the molecule from which it comes, namely tryptophan, which also acts as a psychotropic and gives individuals the pleasure of drinking wine.

Wine has a high caloric content due to the alcohol that it contains; it is said that drinking wine makes you put on weight.

Furthermore, it is very well established that the absorption of alcoholic beverages inhibits reflexes and in now strongly banned, when driving a vehicle or operating heavy machinery.

The technology of this invention uses microporous solids particularly of the hydrophobic zeolite type in whose structure ethyl alcohol molecules and optionally molecules whose molecular weight is equal to or less than that of ethyl alcohol are selectively adsorbed.

It is obvious that separating some or even all of the alcohol that is contained in the wine makes it a beverage that is to be consumed immediately and that has great health benefits, whereby it is understood that alcohol has adverse effects.

This patent application calls for bringing an alcoholic beverage into contact with particular solid substances or running said beverage over said substances.

We are therefore led to consider here the selective separation of a water/alcohol mixture.

For this selective separation, we are led to use one or the other of the microporous solids that generally exhibit at least the two following characteristics:

1.) A hydrophobic characteristic for excluding water; these are microporous solids that do not have an affinity for water but which retain alcohol;
2.) A selective characteristic for not adsorbing the other organic molecules other than those which are smaller than or equal in size to the ethyl alcohol molecules.

This second characteristic in based on two phenomena:
the first phenomenon is based on geometric exclusion: the micropores that are suited to the size of the ethanol molecules are around 6 to 7 angstroms. It is therefore necessary to use structures of the zeolitic type or other structures of this size. Sieving is then performed at the molecular level. This is the case of silicalite-type ZSM-5 from which alumina has been removed. Adsorption or absorption will prove to be appropriate:
the second phenomenon can be kinetic exclusion: it is possible to consider in this case microporous structures with openings that are larger than 7 angstroms, such as, for example, Y sieves or faujasites from which alumina has been completely removed (by steaming, for example), through which adsorption will be faster for small molecules than for large molecules.

Actually, in the case of silicalite-type ZSM-5 (which, however, are entirely suitable for this invention), the degree of adsorption of ethyl alcohol is between 12 and 17% by weight; on the other hand, for a Y sieve from which alumina is removed (such as faujasite, particularly). i.e., a hydrophobic sieve, it is possible to reach a degree of adsorption on the order of 30% by weight of ethyl alcohol. In practice, with a ZSM-5 it takes about 1 kg of this zeolite to completely absorb the alcohol that is contained in 1 liter of wine, while 300 g of Y sieve are sufficient. Y zeolite also has the advantage over ZSM-5 that it can be more readily pressed into the form of particles and in addition is less expensive.

The size of the crystallites also plays an important role with regard to the use of these powders in terms of ease of filtration. By mixing a fine zeolite powder with the wine from which alcohol is to be removed, a suspension is obtained: while this method is very effective in terms of adsorption, it poses the problem of the physical separation of liquid and solid in the suspension. For this reason, by using larger crystallites, it is possible to use filtration and even percolation, whereby it is understood that the phenomenon of adsorption is extremely rapid, on the order of one minute.

In addition to certain types of zeolites, various microporous solids can also be used in this invention. In particular, the following solids that exhibit, for example, the particular feature of being usable in the form of a "beehive" or monoliths will be cited. Bridged polysilsesquioxanes (highly porous hybrid organic-inorganic materials), arylsilsesquioxane gels, and related materials; new organic and inorganic network hybrids will also be cited.

These microporous structures basically contain, as in the zeolites, the Si—O—Si chain.

Amorphous microporous silicas in the form of monoliths can perfectly fulfill the conditions that are mentioned above; the hydrophobic nature and the size of the micropores, on the order of 5 to 7 angstroms, with a selective characteristic for the adsorption of ethyl alcohol.

Another family of products can also fulfill the desired conditions: molecular sieves with carbon chains.

This type of product offers new perspectives and can ensure, with an adsorption level of ethyl alcohol on the order of 50% and even more and, even better, excellent separation of the alcohol that is contained in the wine.

These commercialized products are actually only special forms of activated charcoal; for this reason, the invention also relates to the use of these special forms of activated charcoal that are obtained by controlled pyrolysis of organic polymers, anthracite, coke, and even charcoal.

Finally, it is possible to obtain an adsorption yield of 50% with talcs that have undergone special treatment, particularly to turn them into monolithic form.

These different monoliths of the prior art also include solids such as quartz and carbon fibers that are obtained by, for example, pyrolysis of polyethylenic polymers (ribbonized polymers) (fibers of activated carbon).

Judicious selection of microporous solids also makes it possible to select the desired degree of alcohol removal because, depending on circumstances and the environment, it is not always necessary to remove maximum alcohol at any cost. The removal of 25% or 30% of the alcohol can be enough in some cases.

Let us briefly recall here the basic steps that make it possible to produce wine.

When bunches of grapes are picked, the berries of this grape contain on their surfaces a thin film of white powder, which is actually formed by yeasts (or enzymes). When bunches of grapes are pressed, regardless of whether the grape stalks, the grape skins, and the seeds are left in contact with the grape juice obtained, a reaction is induced that will transform the sugars contained in the grape juice into ethyl alcohol.

This reaction with degradation of the sugars (or wine-making), which can take several days, is an enzymatic reaction (it is the yeasts which will catalyze these reactions for transforming sugars into alcohol), an exothermal reaction (with release of heat), and the release of carbon dioxide. The sugars that are contained in the grape juice can be completely or partially transformed into alcohol and in the latter case form the family of natural sweet wines (VDN).

The rate of advancement of these reactions depends on the ability of enzymes to withstand the temperature during wine-making and/or the alcohol content, which at a certain level ends up killing the yeasts and therefore halts the synthesis of enzymes.

Grape juice is one of the few fruit juices that contain maleic acid in the natural state.

Once wine-making is ended by one of two ways: either $SO_2$ is added to halt any further change in the wine or the so-called "malo-lactic" reaction is induced which, on the chemical level, consists in transforming maleic acid into lactic acid. By so doing, the wine that is obtained has a much more pleasing character and taste.

This "malo-lactic" reaction is catalyzed by bacteria that are either contained in the wine or come from seeds. For this reason, putting in $SO_2$ kills the bacteria, thus blocking the "malo-lactic".

This so-called "malo-lactic" reaction is an athermal reaction (involving neither consumption nor input of heat), and it takes place with release of carbon dioxide.

These are, described simply, the basic steps in the production of wine.

Now, in grape juice, there is, among the hundreds of products present, tryptophan, which is an essential amino acid that corresponds to the formula:

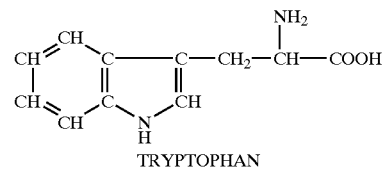

TRYPTOPHAN

In the stage where sugars are transformed into alcohol as was seen above, tryptophan, with alcohol, provides an ester (acid+alcohol provides an ester). Still during this wine-making stage, oxidative amination of the ester of the tryptophan then takes place, which gives rise to a diol (which comprises two a groups):

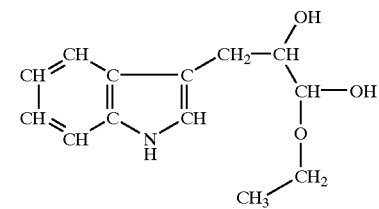

Esterification of tryptophan
after oxidative deamination

By dehydration or dehydrogenation, this diol is cyclized to give rise to what we have called "cliousclatine," which is a molecule with a molecular weight of 233 g whose formula has three cycles, of which one cycle is aromatic and should have a formula of this type:

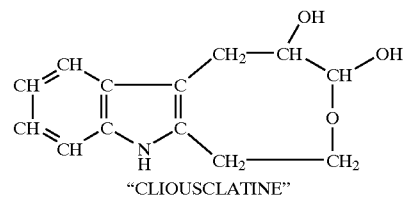

"CLIOUSCLATINE"

The basic structure of this "cliousclatine" comprises an indolic-base core that is found in products that have a strongly serotoninergic activity of two types:

anti-depressants such as fluoxetine (Prozac-trade name), or hallucinogens derived from LSD 25 (name of German origin).

LSD 25 or lysergic acid diethylamide 25; contains four cycles, of which one is aromatic:

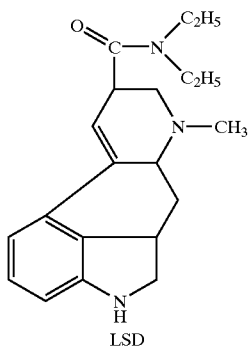

LSD

The "cliousclatine" that we have identified, which is obviously contained at a very low dose in wine, has a psychotropic action that is both anti-depressant and even hallucinogenic and that should depend on molecules that are associated with it. The volatilization temperature of "cliousclatine" is close to that of cocaine, or approximately 190° C.

It is true that there are, in general, wines that are more sought-after as beverages than others, hence our idea of removing alcohol from wine without impairing the pleasure of consuming it. At the end of the process according to the invention, wine or alcoholic beverages from which alcohol is at least partially removed retains at least part of the molecules of cliousclatine and/or of tryptophan contained in this wine or this beverage from which some or all of the alcohol is removed.

The invention therefore relates to a process for eliminating from an alcoholic beverage at least part of the alcohol (ethanol and other alcohols with a low molecular weight such as methanol) that it contains and for retaining at least part of the molecules of compounds that it contains, whereby said compounds are selected from the group that consists of tryptophan and "cliousclatine"; in which process the alcoholic beverage is run over at least one bed with at least one solid substance or in which process the alcoholic beverage is brought into contact with a layer of at least one solid substance, whereby the diameter of the pores of said bed or of said layer and the hydrophobicity characteristics of said bed or said layer make possible the specific adsorption of ethanol and other alcohols with a low molecular weight, whereby said solid substance is selected from the group that consists of zeolites and solids with a microporous structure of the monolith type, as well as of foams, and even cloths made of said substances whose porous structure promotes adsorption.

Preferably, in this process, the zeolite or solid with a microporous structure has openings that are equal to or greater than about 5 angstroms, and said solid substance is selected from the group that consists of ZSM-5 zeolites, Y zeolites, with a faujasite structure in particular, polysilsesquioxanes, arylsilsesquioxane gels, amorphous microporous silicas in the form of monoliths, molecular sieves with a carbon chain, quartzes, and activated carbon fibers.

Preferably, the invention is also characterized in that said solids with a microporous structure consist of activated charcoal in the form of solid particles (in preformed pieces (extrudates, balls, rings) or not (crushed) in the form of cloths made of fibers of these activated charcoals, and even polyurethane foam, for example, activated charcoal.

Also preferably, the zeolite or solid with a microporous structure has openings that are equal to or greater than about 5 angstroms and at least 90% of the pores are between 5 and 10 angstroms in diameter.

It will be noted that the process makes it possible, as an example, to use a beverage from which some or all of the alcohol was removed and which can be advantageously consumed in a fairly short time, such as the mean duration of a meal (about 2 hours).

In this invention, a very practical use for solid substances that have a monolithic and/or silicalite structure in particular should be pointed out: said use consists not in percolating the alcoholic beverage but in pouring it right during mealtimes into a carafe or into guests' glasses, whereby said carafe or glasses have been specially treated so that their internal surface or internal wall is coated with a layer of said solid, for example a silicalite or an ultrafine microporous silica in which a particular porosity has been created that can implement the invention. When poured into the carafe or glass, the wine's alcohol level decreases by, for example, 5 to 65%, with the remaining alcohol being absorbed or adsorbed selectively in the pores of the coating. After the beverage from which alcohol has been removed is consumed, the glass or carafe is thrown out, or else the layer that the glass or the carafe contains is regenerated by heating said glass or carafe to a temperature that is greater than the boiling point or at the very least the evaporation point of the alcohol or alcohols that are absorbed or adsorbed on said layer, for example, in a dishwasher. The alcohol is evaporated, and the glasses or carafes that are coated with said silicalite or an equivalent product can be reused immediately.

The entire disclosure of all applications, patents and publications, cited above and below, and of corresponding French application No. 97/01.139, filed Jan. 30, 1997, is hereby incorporated by reference.

What is claimed is:

1. A process for the removal of at least a portion of alcohol contained in an alcoholic beverage, comprising contacting said beverage with a carafe or glass containing thereon a porous, hydrophobic solid specifically adsorbing ethanol and other alcohols with a molecular weight equal to or less than ethanol and not tryptophan and cliousclatine, producing a lower alcohol beverage, and regenerating said solid by heating, in a dishwasher.

2. A process according to claim 1, wherein contacting with the hydrophobic solid is conducted immediately prior to consumption.

3. A process according to claim 1, wherein the solid is a zeolite or a monolithic microporous solid.

4. A process according to claim 1, wherein the solid is a zeolite.

5. A process according to claim 1, wherein said solid substance is silicalite or ultrafine microporous silica.

6. A process according to claim 3, wherein the zeolite or microporous solid has pores that are equal to or greater than about 5 angstroms and at least 90% of the pores are between 5 and 10 angstroms in diameter.

7. A process according to claim 1, wherein said solid substance is ZSM-5 zeolite, dealuminated ZSM-5, Y zeolites, or dealuminated faujasite zeolite.

8. A process for the removal of at least a portion of alcohol contained in an alcoholic beverage, comprising contacting said beverage immediately prior to consumption with a carafe or glass containing thereon a porous, hydrophobic solid specifically adsorbing ethanol and other alcohols with a molecular weight equal to or less than ethanol and not tryptophan and cliousclatine, thereby producing a lower alcohol beverage.

* * * * *